(12) United States Patent
Umemura et al.

(10) Patent No.: US 8,965,565 B2
(45) Date of Patent: Feb. 24, 2015

(54) METHOD AND DEVICE FOR SORTING PLASTIC, AND METHOD FOR MANUFACTURING RECYCLABLE PLASTIC

(75) Inventors: Sonoko Umemura, Tokyo (JP); Junji Tanimura, Tokyo (JP); Masaru Kinugawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/991,515

(22) PCT Filed: Oct. 12, 2011

(86) PCT No.: PCT/JP2011/073384
§ 371 (c)(1),
(2), (4) Date: Jun. 4, 2013

(87) PCT Pub. No.: WO2012/101874
PCT Pub. Date: Aug. 2, 2012

(65) Prior Publication Data
US 2013/0274914 A1 Oct. 17, 2013

(30) Foreign Application Priority Data

Jan. 28, 2011 (JP) ................................. 2011-016224

(51) Int. Cl.
*G06F 7/00* (2006.01)
*B07C 5/00* (2006.01)
*B07C 5/342* (2006.01)
(Continued)

(52) U.S. Cl.
CPC . *B07C 5/00* (2013.01); *B07C 5/342* (2013.01); *B29B 17/02* (2013.01); *B03C 7/006* (2013.01); *B03C 7/12* (2013.01);
(Continued)

(58) Field of Classification Search
CPC .......... B29B 7/00; B29B 2009/00; B03B 1/00
See application file for complete search history.

(56) References Cited

U.S. PATENT DOCUMENTS

| | | | | |
|---|---|---|---|---|
| 4,626,474 A | * | 12/1986 | Kim | 428/416 |
| 5,746,320 A | | 5/1998 | Fujita et al. | |
| 6,426,474 B1 | * | 7/2002 | Maehata et al. | 209/127.1 |
| 2010/0126914 A1 | * | 5/2010 | Valerio | 209/20 |
| 2010/0282647 A1 | * | 11/2010 | Miller et al. | 209/12.2 |

FOREIGN PATENT DOCUMENTS

| | | |
|---|---|---|
| JP | 62 183891 | 8/1987 |
| JP | 63 218288 | 9/1988 |

(Continued)

OTHER PUBLICATIONS

International Search Report Issued Jan. 10, 2012 in PCT/JP11/73384 Filed Oct. 12, 2011.

*Primary Examiner* — Yolanda Cumbess
(74) *Attorney, Agent, or Firm* — Oblon, Spivak, McClelland, Maier & Neustadt, L.L.P.

(57) ABSTRACT

A sorting method for plastics, including: sorting a predetermined plastic piece from a mixed plastic piece group including plastic pieces of a plurality of types; identifying the plurality of types of the plastic pieces; and calculating mixing rates of the plurality of types in the mixed plastic piece group based on a result obtained in the identifying, the identifying is performed on the mixed plastic piece group prior to the sorting, a sorting condition of the sorting is set based on an identification result obtained in the identifying, the identifying includes identifying the plurality of types of the plastic pieces with a beam.

10 Claims, 20 Drawing Sheets

(51) Int. Cl.
  *B29B 17/02* (2006.01)
  *B03C 7/00* (2006.01)
  *B03C 7/12* (2006.01)
  *B29K 23/00* (2006.01)
  *B29K 25/00* (2006.01)
  *B29K 55/02* (2006.01)

(52) U.S. Cl.
  CPC .... *B29B 2017/0203* (2013.01); *B29K 2023/12* (2013.01); *B29K 2025/06* (2013.01); *B29K 2055/02* (2013.01)
  USPC ............ 700/223; 700/213; 700/239; 700/240

(56) References Cited

FOREIGN PATENT DOCUMENTS

| | | |
|---|---|---|
| JP | 6 47350 | 2/1994 |
| JP | 7 328482 | 12/1995 |
| JP | 2512265 | 7/1996 |
| JP | 2001 108527 | 4/2001 |
| JP | 2003 24874 | 1/2003 |
| JP | 3640571 | 4/2005 |
| JP | 2010 253444 | 11/2010 |
| WO | 2009 104566 | 8/2009 |
| WO | 2010 092645 | 8/2010 |

* cited by examiner

FIG. 5

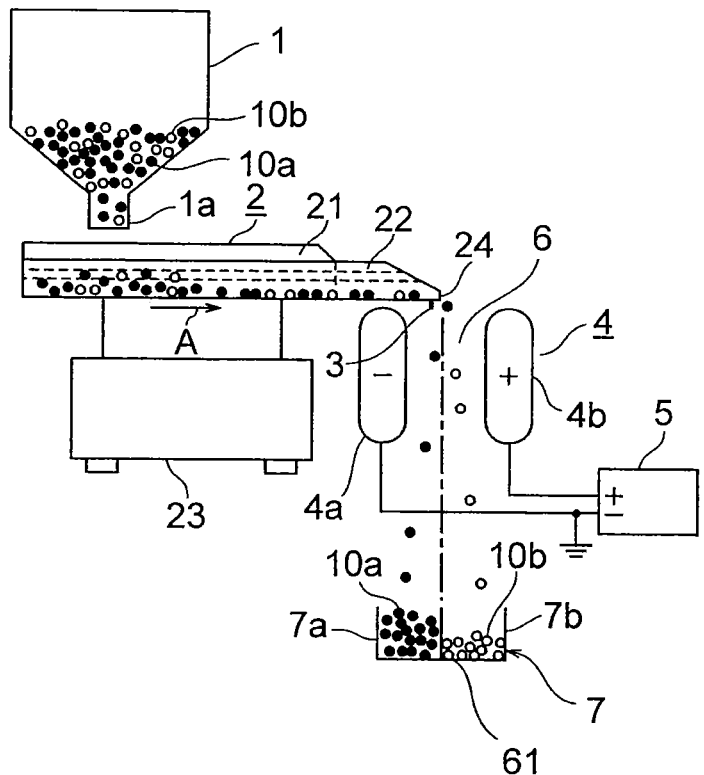

1: TRIBOELECTRIFICATION DEVICE
2: CONVEYING APPARATUS (VIBRATING TROUGH)
4a: FIRST ELECTRODE (GROUND ELECTRODE)
4b: SECOND ELECTRODE (COUNTER ELECTRODE)
5: HIGH VOLTAGE POWER SOURCE
7: COLLECTION CONTAINER
7a FIRST CONTAINER PORTION
7b: SECOND CONTAINER PORTION
10a, 10b: GRANULAR SOLID (PLASTIC PIECE)
21: FRAME
22: CONVEYANCE PATH
23: VIBRATING PORTION
24: DROPPING PORTION
61: MOVABLE PARTITION PLATE

METHOD AND DEVICE FOR SORTING PLASTIC, AND METHOD FOR MANUFACTURING RECYCLABLE PLASTIC

TECHNICAL FIELD

This invention relates to a sorting method for plastics, a sorting apparatus for plastics, and a production method for recycled plastics, which are configured to sort reusable recycled plastics from mixed plastic pieces collected from used household appliances, used OA apparatus, and the like.

BACKGROUND ART

FIG. 20 illustrates a conventional sorting method. In the conventional sorting method, a wet specific-gravity sorting utilizing differences in specific gravity between types of plastics is performed on a mixed plastic piece group including a mixture of plastic pieces of a plurality of types. With this, the plastic pieces are sorted and collected into polypropylene (PP) plastic pieces having a specific gravity of 1.0 or less, acrylonitrile butadiene (ABS) plastic pieces, polystyrene (PS) plastic pieces, and high specific-gravity PP plastic pieces (PP plastic pieces having a high specific gravity due to glass fiber or the like added thereto, which are represented as "heavy PP" in FIG. 20) each having a specific gravity of from 1.0 to 1.1, and high specific-gravity plastic pieces having a specific gravity of 1.1 or more.

The PP plastic pieces other than the sorted high specific-gravity PP plastic pieces are subjected to washing and foreign matter removal so as to obtain recycled PP plastic pieces.

The ABS plastic pieces, the PS plastic pieces, and the high specific-gravity PP plastic pieces each having substantially the same specific gravity are subjected to first stage electrostatic sorting by utilizing characteristics of plastics, that is, differences in triboelectric series of types of plastics. With this, the plastic pieces of those types are separated and collected as positively charged ABS plastic pieces, negatively charged PS plastic pieces, and negatively charged high specific-gravity PP plastic pieces. Of those, a mixed plastic piece group of the PS plastic pieces and the high specific-gravity PP plastic pieces is further subjected to second stage electrostatic sorting other than the first stage electrostatic sorting. With this, positively charged PS plastic pieces and negatively charged high specific-gravity PP plastic pieces are sorted and collected (for example, refer to Non Patent Literature 1, Patent Literature 1, and Patent Literature 2).

CITATION LIST

Non Patent Literature

[NPL 1] "Toshi Seisou" JAPAN WASTE MANAGEMENT ASSOCIATION, page 68 and FIG. 4 of No. 294 in Volume 63 (March 2010)

Patent Literature

[PTL 1] JP 4481629 B
[PTL 2] JP 2005-138030 A

SUMMARY OF INVENTION

Technical Problem

Various discarded household appliances are collected at various rates. For example, air conditioners account for a large proportion of the discarded household appliances in summer. Thus, mixing rates of mixed plastic pieces of plastics to be recycled fluctuate depending on seasons or months. Meanwhile, operation conditions of a wet specific-gravity sorting apparatus and an electrostatic sorting apparatus are set based on normal mixing rates.

Thus, a conventional wet specific-gravity sorting apparatus or a conventional electrostatic sorting apparatus has a problem in that a collection rate is lowered due to deterioration in accuracy of sorting plastic pieces when the mixing rates in the mixed plastic piece group fluctuate with respect to the normal rates.

This invention has been made to solve the problem as described above, and it is an object thereof to provide a sorting method for plastics, a sorting apparatus to be used in the sorting method, and a production method for recycled plastics, which maintain high sorting accuracy and a high collection rate even when the mixing rates in the mixed plastic piece group fluctuate with respect to normal rates.

Solution to Problems

According to this invention, there is provided a sorting method for plastics, including: a sorting step of sorting a predetermined plastic piece from a mixed plastic piece group including plastic pieces of a plurality of types; an identifying step of identifying the plurality of types of the plastic pieces; and a data processing step of calculating mixing rates of the plastic pieces of the plurality of types in the mixed plastic piece group based on a result obtained in the identifying step, in which the identifying step is performed on the mixed plastic piece group prior to the sorting step, and in which the identifying step includes identifying the plurality of types of the plastic pieces with a beam.

Advantageous Effects of Invention

According to this invention, the mixing rates in the mixed plastic piece group as a sorting object are obtained prior to the sorting step. Thus, specific-gravity sorting conditions and electrostatic sorting conditions can be set in accordance with the mixing rates, and hence a novel and marked advantage of highly accurate and highly efficient collection can be achieved.

BRIEF DESCRIPTION OF DRAWINGS

FIG. 5 A structural view of electrostatic sorting means to be used in the sorting method for plastics according to the third embodiment of the present invention.

DESCRIPTION OF EMBODIMENTS

First Embodiment

Figure 1:
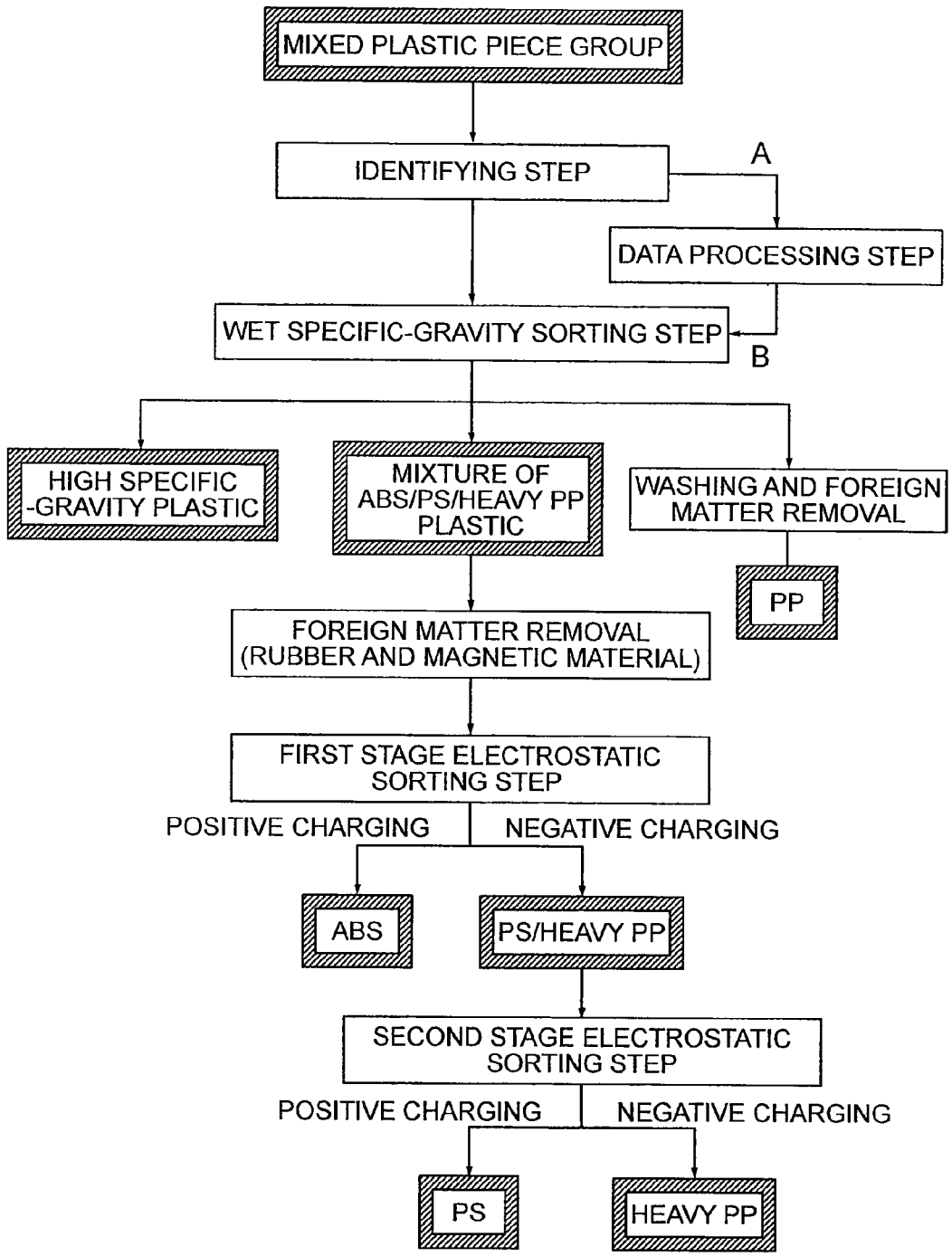
FIG. 1 A flowchart illustrating a sorting method for plastics according to a first embodiment of the present invention.

FIG. 1 is a flowchart illustrating a sorting method for plastics according to a first embodiment of the present invention. Description is made of the sorting method for plastics with reference to FIG. 1. In a step of performing identification with identifying means for identifying types of plastic pieces, plastic pieces of a plurality of types in a mixed plastic piece group are subjected to the identification by being caused to pass through the identifying means. Results of the identification are sent into a data processing step, and data processing means calculates a mixing rate of each of the types in the mixed plastic piece group.

Note that, the mixing rates of the types in the mixed plastic piece group refer to mixing rates of the plastic pieces of the plurality of types in the mixed plastic piece.

The plastic pieces herein refer mainly to fragments obtained by crushing plastics to be recycled from discarded household appliances to be collected (the same applies to the following description). Note that, as a matter of course, the present invention is applicable also to uncrushed plastic pieces and newly produced plastic pieces.

The identifying means uses a beam in the identifying step. For example, a mid-infrared beam (hereinafter referred to as infrared beam) with a wavelength of from 2.5 µm to 25 µm is used as the beam. Infrared beams are applied to plastic pieces conveyed to an optical identification apparatus for identifying types of plastics by utilizing characteristics of beams, and the types of the plastics are identified based on reflection infrared beams reflected by the plastic pieces. Examples of the optical identification apparatus herein include an identification apparatus disclosed in Japanese Patent Application No. 2010-249473, and examples of an apparatus for conveying the plastic piece to the optical identification apparatus include a conveying apparatus disclosed in Japanese Patent Application No. 2010-252036. However, the present invention is not limited particularly to those apparatus.

With use of the identifying means for identifying the types of the plastic pieces with a beam, the types can be determined within a short period of time without any influence on the mixed plastic piece group, which leads to an advantage that a subsequent sorting step is not influenced at all.

Further, the infrared beam is used as the beam, but the beam is not particularly limited to the infrared beam, and a Raman beam, a near-infrared beam, and the like may be used. Use of the Raman beam is advantageous in that identification can be performed even when plastic pieces as identification objects are black. Use of the near-infrared beam is disadvantageous in that the identification of the black plastic pieces is difficult, but is advantageous in that each plastic piece can be identified within a short period of time, and hence a large number of plastic pieces can be identified within a limited period of time.

Use of the mid-infrared beam is advantageous in that plastic pieces of many types and plastic pieces with various additives and the like, such as highly fluorescent plastic pieces and the black plastic pieces, can be easily identified.

In the data processing step, the data processing means counts the plastic pieces of the same type, and calculates the mixing rates based on the count. The data processing means is not particularly limited and may include a personal computer and other arithmetic units as long as desired data can be obtained.

The mixing rates may include an average rate per unit time period, a cumulative rate per unit time period, and a cumulative rate with respect to a total number. Those conditions may be appropriately set in accordance with operating conditions, design conditions, and the like of factory equipment and the like.

Further, with regard to the mixing rates herein each based on the number of the plastic pieces, the mixing rates each may be based on a weight instead of the number of the plastic pieces. Those conditions may be appropriately set in accordance with the operating conditions, the design conditions, and the like of the factory and the like.

Subsequent steps are substantially the same as those in the conventional technology. Specifically, after the identification with the identifying means, the mixed plastic piece group is subjected to a wet specific-gravity sorting step with wet specific-gravity sorting means which utilizes differences in specific gravity between the types of the plastics. In this way, the plastic pieces are sorted and collected into PP plastic pieces having a specific gravity of 1.0 or less, ABS plastic pieces, PS plastic pieces, and high specific-gravity PP plastic pieces each having a specific gravity of from 1.0 to 1.1, and high specific-gravity plastic pieces having a specific gravity of 1.1 or more.

Note that, when the ABS plastic pieces thus collected include ABS plastic pieces having a specific gravity which is as high as 1.1 or more due to glass fiber or the like added thereto, an upper threshold of the specific-gravity sorting is set to more than 1.1. Further, the upper threshold is set to less than 1.1 when ABS plastic pieces with less additive are collected. Note that, a specific gravity of additive-free ABS plastic pieces is set to more than 1.05, and the same applies to the PS plastic pieces. In the description of this embodiment, the thresholds in the preceding example are used as the thresholds of the specific-gravity sorting. However, the technical scope of the present invention is not limited to the thresholds in the preceding example.

The sorted PP plastic pieces are subjected to a washing and foreign matter removing step, and then sent as recycled PP plastic pieces into a recycling step.

The ABS plastic pieces, the PS plastic pieces, and the high specific-gravity PP plastic pieces each having substantially the same specific gravity are subjected to a first stage electrostatic sorting step with first stage electrostatic sorting means which utilizes characteristics of plastics, that is, differences in triboelectric series of types of plastics. With this, the plastic pieces of the mixed plastic piece group are separated and collected as positively charged ABS plastic pieces, negatively charged PS plastic pieces, and negatively charged high specific-gravity PP plastic pieces.

Of those, the PS plastic pieces and the high specific-gravity PP plastic pieces are further subjected to a second stage electrostatic sorting step with second stage electrostatic sorting means other than the first stage electrostatic sorting means. With this, positively charged PS plastic pieces and negatively charged high specific-gravity PP plastic pieces are sorted and collected.

Figure 2:
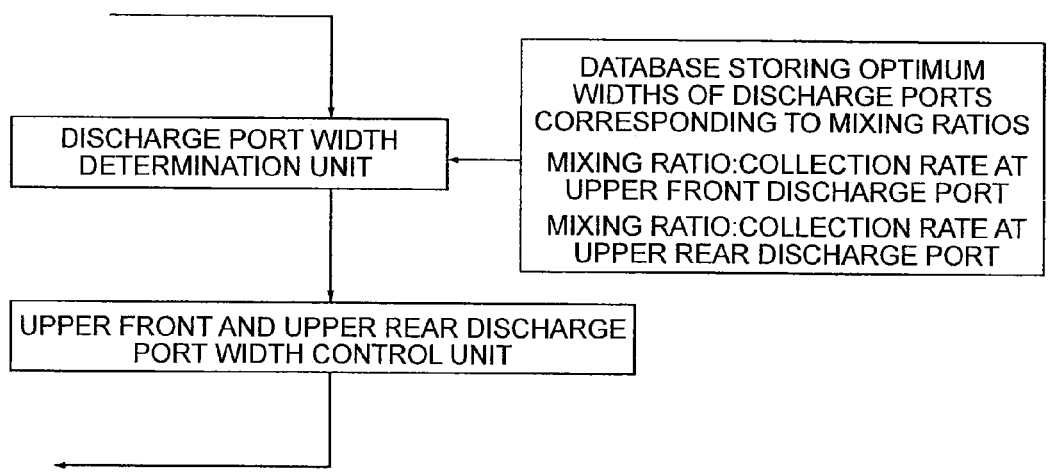
FIG. 2 A schematic configuration view illustrating a data processing step in the sorting method for plastics according to the first embodiment of the present invention.

The present invention and conventional technologies are different from each other in the following point. The configuration of the present invention is obtained by providing a control function which uses data from the data processing means, for example, to the conventional wet specific-gravity sorting apparatus as illustrated in FIGS. 1 and 2 of Patent Literature 1 mentioned above, whereas the configuration of the conventional technologies does not include this control function. Specifically, the present invention is different from the conventional technologies in the following point. In the present invention, the data of the mixing rates of the types in the mixed plastic piece group, which are calculated by the data processing means, is sent to the wet specific-gravity sorting apparatus, and the configuration of the present invention has the control function to control, based on this data, at least one of a supply amount of the mixed plastic piece group into a supply port 23 of the wet specific-gravity sorting apparatus, at least one area of a lower discharge port 26, an upper front discharge port 27, and an upper rear discharge port 28, a specific gravity of salt water 24 (specific gravity liquid), and the like.

The wet specific-gravity sorting apparatus utilizes the differences in specific gravity between types of plastic pieces. Specifically, as illustrated in FIG. 2 of Patent Literature 1 mentioned above, the wet specific-gravity sorting apparatus includes a bath for storing the salt water as the specific gravity liquid, in which shredder dust (mixed plastic piece group) put into the salt water is sorted based on types of plastic pieces through floating layer sorting.

In this case, the supply port 23 provided to the bath serves as a supply port for the mixed plastic piece group into the salt water. For example, of the plastic pieces of the plurality of types, the high specific-gravity plastic pieces sink to a bottom of the bath, and the plastic pieces of the other plurality of types form a layer in accordance with the specific gravity on a surface side of the salt water in a depth direction of the salt water, and flow on the surface side of the salt water.

The lower discharge port 26 is provided on the bottom side of the bath so as to serve as a discharge port for taking out the sunk plastic pieces. The upper front discharge port 27 and the upper rear discharge port 28 are provided on an upper layer side of the bath so as to serve as discharge ports for taking out plastic pieces of specific types moving in the bath while forming the layer (floating layer) on the surface side of the salt water.

FIG. 2 is a schematic configuration view illustrating the data processing step in the sorting method for plastics according to the first embodiment of the present invention. Reference symbols A and B in FIG. 2 correspond respectively to reference symbols A and B in FIG. 1.

As illustrated in FIG. 2, the data processing means includes a database storing optimum widths of the discharge ports 27 and 28. The optimum widths are determined based on the mixing rates of the types in the mixed plastic piece group, which are obtained from the results of the identification in the identifying step, so that plastics can be collected with higher sorting accuracy.

In the data processing means, a discharge port width determination unit determines the optimum widths of the discharge ports 27 and 28 corresponding to the mixing rates of plastics from the database, and sends the data of the optimum widths to an upper front and upper rear discharge port width control unit.

Further, the upper front and upper rear discharge port width control unit sends an upper front discharge port width control signal and an upper rear discharge port width control signal for controlling widths of the upper front discharge port 27 and the upper rear discharge port 28 to the optimum widths. In response to those signals, areas of the upper front discharge port 27 and the upper rear discharge port 28 are controlled.

Note that, a configuration in which apertures of the upper front discharge port 27 and the upper rear discharge port 28 are adjustable enables the areas of the upper front discharge port 27 and the upper rear discharge port 28 to be controlled.

With this, wet specific-gravity sorting conditions can be set in accordance with the mixing rates, and hence a novel and marked advantage of highly accurate and highly efficient collection can be achieved.

According to such a sorting method, optimum sorting conditions can be set in accordance with the mixing rates prior to sorting. Thus, a collection yield and a collection rate of sorted PP plastic pieces are enhanced, and hence highly efficient sorting can be performed.

The mixing rate may be calculated based not only on the number of plastic pieces as in this embodiment, but also on a weight ratio obtained by calculating an approximate weight of the plastic pieces, for example, from sizes of the plastic pieces and from a specific gravity calculated based on a type of the plastic pieces. In order to more accurately calculate the mixing rate based on the weight ratio, a weighing instrument may be installed so that the weight ratio is obtained by calculating a weight of the plastic pieces prior to or after the identification with the optical identification apparatus.

In contrast, a specific gravity distribution of a plastic type to be sorted may be calculated with the optical identification apparatus and the weighing instrument, and a specific gravity of the specific gravity liquid to be used for sorting may be determined.

Second Embodiment

In the first embodiment described above, the types of all the plastic pieces in the mixed plastic piece group are identified with the identifying means in the identifying step, and then sent into the wet specific-gravity sorting step. However, the same advantage can be obtained also when a sampling step of picking up a certain amount of plastic pieces from the mixed plastic piece group is performed so as to pick up a part of the mixed plastic piece group and identify plastic pieces thus picked up from the mixed plastic piece group with the identifying means.

Figure 3:
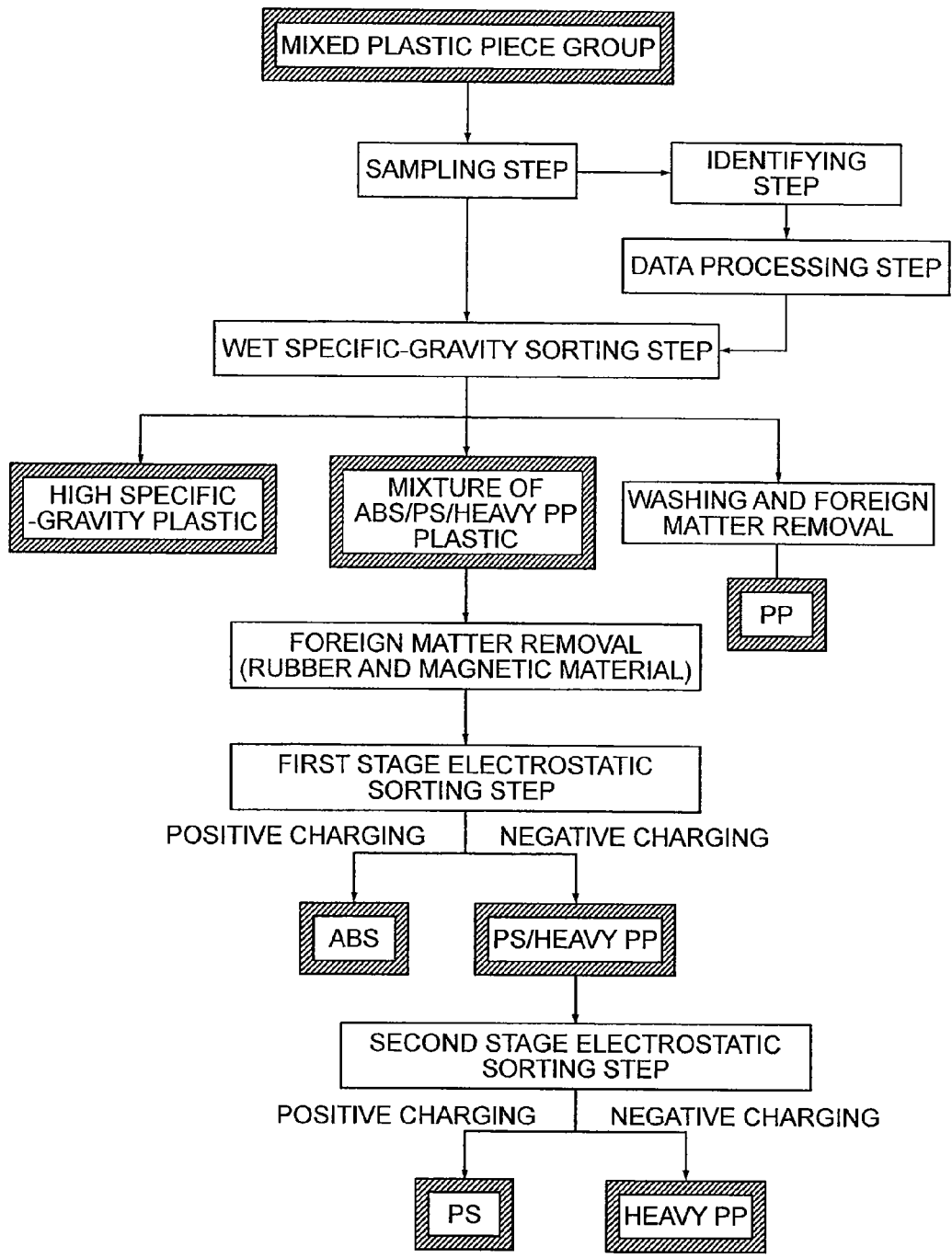
FIG. 3 A flowchart illustrating a sorting method for plastics according to a second embodiment of the present invention.

FIG. 3 is a flowchart illustrating a sorting method for plastics according to a second embodiment of the present invention.

As illustrated in FIG. 3, the second embodiment is different from the first embodiment described above in the following point. Specifically, the sampling step is performed prior to the wet specific-gravity sorting step, and type identification is performed on each plastic piece picked up from a part of the mixed plastic piece group by sampling means in the sampling step. Results of the identification are sent into the data processing step, and the mixing rate of each of the types in the mixed plastic piece group is calculated.

Subsequent steps are the same as those in the first embodiment described above, and hence description thereof is omitted.

When such a sampling step is performed, the number of plastic pieces to be identified within a unit time period can be saved in comparison with that in total inspection. Thus, it is unnecessary to design the identification apparatus to have, for example, higher processing capability, which leads to advantages of cost reduction and downsizing of the identification apparatus.

In the sampling in the second embodiment, prior to the wet specific-gravity sorting step, for example, one thousand pieces are sampled at random from the mixed plastic piece group to be sorted. A type of each of the one thousand plastic pieces is identified in the identifying step, and the mixing rates in the mixed plastic piece group to be sorted are calculated from respective sums of the types. The optimum sorting conditions of the wet specific-gravity sorting means can be set based on the mixing ratios thus obtained. Description is made of a case where the configuration of the present application is obtained by providing the control function, for example, to the wet specific-gravity sorting apparatus as illustrated in FIGS. 1 and 2 of Patent Literature 1 mentioned above, the control function using data from the data processing means. In the present application, the data of the mixing rates of the types in the mixed plastic piece group, which are calculated by the data processing means, is sent to the wet specific-gravity sorting apparatus. Based on the data, control is performed on at least one of the supply amount with respect to the supply port 23 of the wet specific-gravity sorting apparatus, at least one area of the lower discharge port 26, the upper front discharge port 27, and the upper rear discharge port 28, the specific gravity of the salt water 24 (specific gravity liquid), and the like.

With this, wet specific-gravity sorting conditions can be set in accordance with the mixing rates, and hence a novel and marked advantage of highly accurate and highly efficient collection can be achieved.

According to such a sorting method, optimum sorting conditions can be set in accordance with the mixing rates prior to sorting. Thus, a collection yield and a collection rate of sorted PP plastic pieces are enhanced, and hence highly efficient sorting can be performed.

The mixing rate may be calculated based not only on the number of plastic pieces as in this embodiment, but also on a weight ratio obtained by calculating an approximate weight of the plastic pieces, for example, from sizes of the plastic pieces and from a specific gravity calculated based on a type of the plastics. In order to more accurately calculate the mixing rate based on the weight ratio, a weighing instrument may be installed so that the weight ratio is obtained by calculating a weight of the plastic pieces prior to or after the identification with the optical identification apparatus.

In contrast, a specific gravity distribution of a plastic type to be sorted may be calculated with the optical identification apparatus and the weighing instrument, and a specific gravity of the specific gravity liquid to be used for sorting may be determined.

With regard to the number of samples, which is set to one thousand in the example described above, when the number of samples is small, the mixing rates in the mixed plastic piece group subjected to sampling and the mixing rates in a universe, that is, the mixed plastic piece group to be sorted, do not match each other. Meanwhile, when the number of samples is large, identification takes a longer period of time. Although it is necessary to determine the number of samples in accordance with accuracy required for calculating mixing rates in the universe, approximately one thousand samples are practically sufficient for the sampling.

Third Embodiment

In the first embodiment described above, the types of the plastic pieces in the mixed plastic piece group to be sent into the wet specific-gravity sorting step are identified with the identifying means, and the mixing rates in the mixed plastic piece group are calculated. In this embodiment, the types of the plastic pieces in the mixed plastic piece group (mixture of ABS plastic pieces, PS plastic pieces, and high specific-gravity PP plastic pieces) to be sent into the first stage electrostatic sorting step are identified with the identifying means, and the mixing rates in the mixed plastic piece group are calculated with the data processing means. In this way, sorting with the first stage electrostatic sorting means can be performed with higher accuracy.

Figure 4:
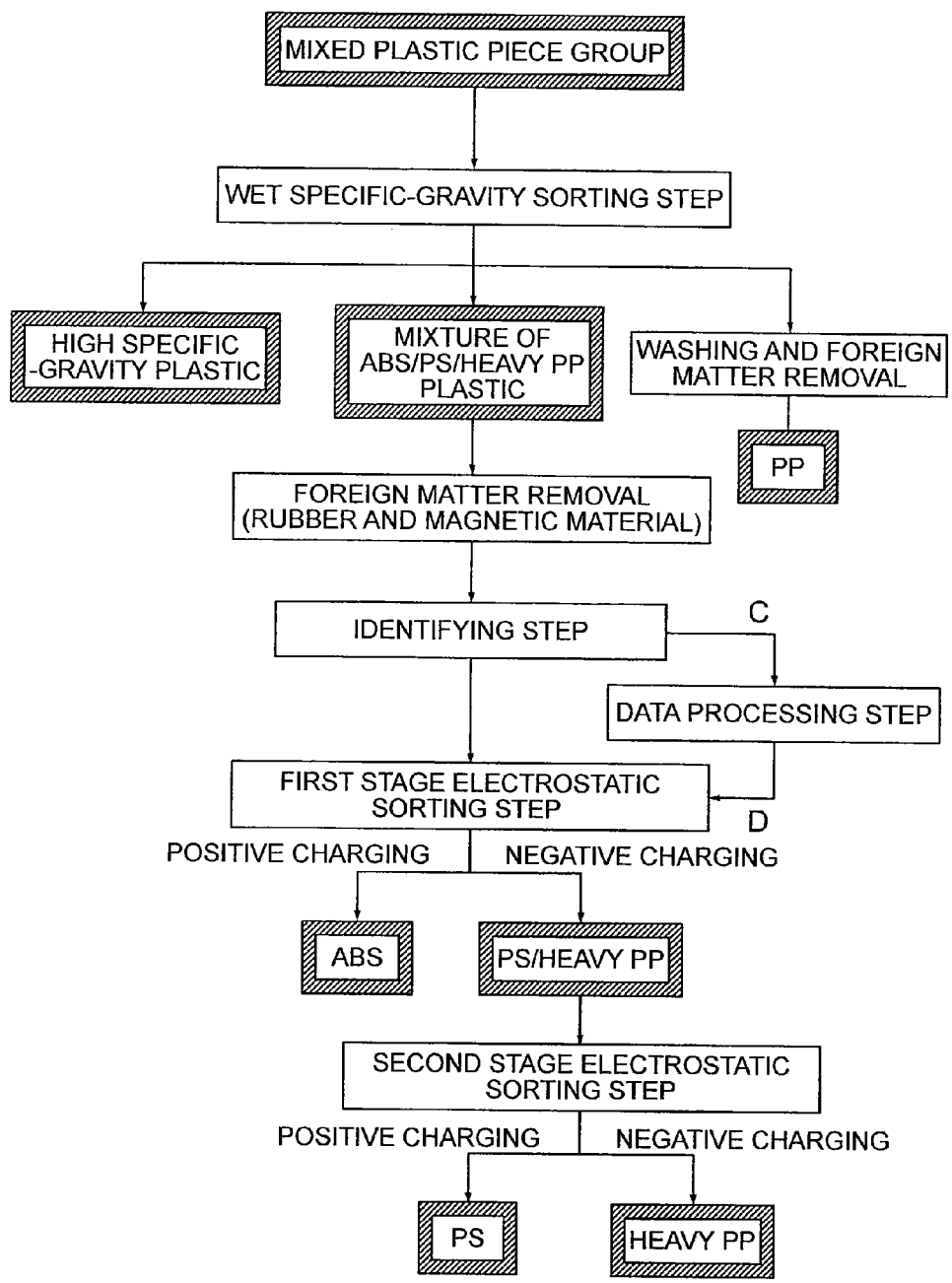
FIG. 4 A flowchart illustrating a sorting method for plastics according to a third embodiment of the present invention.

FIG. 4 is a flowchart illustrating a sorting method for plastics according to a third embodiment of the present invention.

As illustrated in FIG. 4, the third embodiment is different from the first embodiment described above in the following point. Specifically, the identifying step is performed prior to the first stage electrostatic sorting step performed with use of the first stage electrostatic sorting means so as to identify the types of the plastic pieces to pass through the first stage electrostatic sorting means. Results of the identification are sent into the data processing means, and the mixing rate of each of the types in the mixed plastic piece group is calculated.

Other steps and means are the same as those in the first embodiment described above, and hence description thereof is omitted.

With this, optimum sorting conditions of the first stage electrostatic sorting means in the first stage electrostatic sorting step can be set based on the mixing rates.

In the following, description is made of a structure of the first stage electrostatic sorting means and the first stage electrostatic sorting step using the first stage electrostatic sorting means.

FIG. 5 is a structural view of the first electrostatic sorting means to be used in the sorting method for plastics according to the third embodiment of the present invention.

As illustrated in FIG. 5, the first stage electrostatic sorting means includes a conveying apparatus 2 for dropping the mixed plastic piece group including electrically charged plastic pieces of a plurality of types, a pair of electrodes 4a and 4b arranged along a path of the mixed plastic piece group to be dropped from the conveying apparatus 2 and electrically charged respectively with polarities opposite to each other, a collection container 7 arranged at a drop destination of the mixed plastic piece group which passes between the electrodes 4a and 4b, and a movable partition plate 61 for partitioning the collection container 7 into a first container portion 7a and a second container portion 7b.

Specifically, as illustrated in FIG. 5, the configuration of the first stage electrostatic sorting means of the present application is obtained by providing the movable partition plate 61, which can be controlled in movement based on the data from the data processing means, to an electrostatic sorting apparatus similar to that illustrated in FIG. 1 of Patent Literature 2 mentioned above so that the collection container 7 is partitioned into the first container portion 7a and the second container portion 7b. Along with movement of the movable partition plate 61, a ratio of areas of collection ports of the first container portion 7a and the second container portion 7b with respect to the plastic pieces is changed. When the position of the movable partition plate 61 is adjusted based on the data of the mixing rates of the types in the mixed plastic piece group, which are calculated by the data processing means, the optimum sorting conditions of the first stage electrostatic sorting means in the first stage electrostatic sorting step can be set based on the mixing rates. In other words, through accurate control on the position of the movable partition plate 61 within the collection container 7, the plastic pieces are collected into the different container portions 7a and 7b in accordance with the types.

Known technologies such as a movable mechanism using a motor, a manual movable mechanism, a gear, a belt, and oil hydraulics can be used as a movable mechanism for generating a moving force of the movable partition plate 61.

The movable partition plate 61 may include one movable partition plate 61, two movable partition plates 61, or three or more movable partition plates 61. Alternatively, depending on the mixing rates, the container may be divided into three with intermediate partitions.

Still alternatively, based on the data of the mixing rates of the types in the mixed plastic piece group, which are calculate by the data processing means, voltages to be applied to the electrode 4a and the electrode 4b may be changed, and a clearance between the electrode 4a and the electrode 4b may be adjusted.

Figure 6:
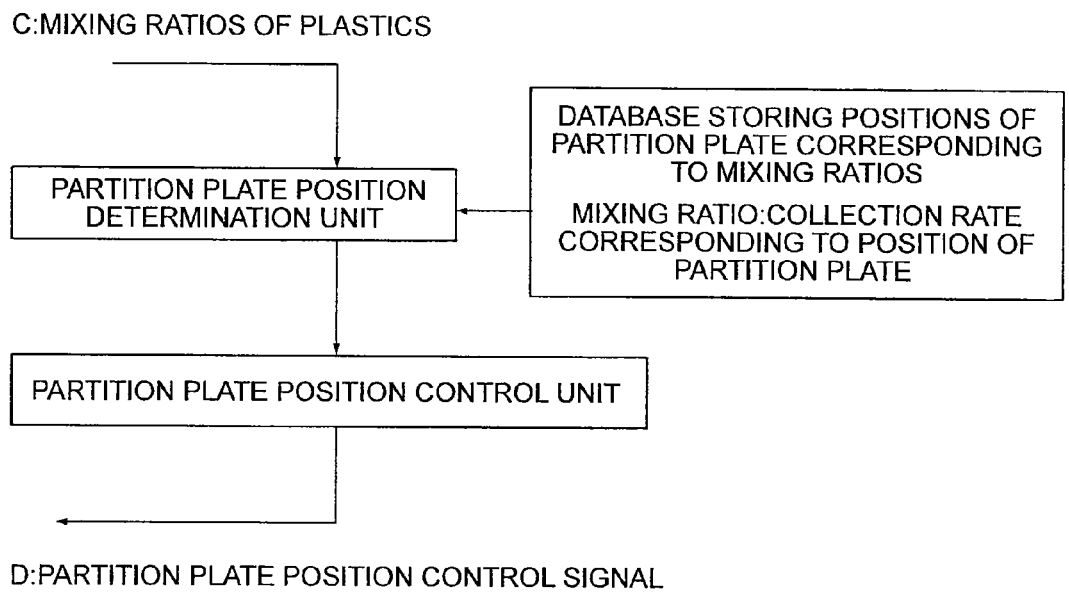
FIG. 6 A schematic configuration view illustrating a data processing step in the sorting method for plastics according to the third embodiment of the present invention.

FIG. 6 is a schematic configuration view illustrating the data processing step in the sorting method for plastics according to the third embodiment of the present invention. Reference symbols C and D in FIG. 6 correspond respectively to reference symbols C and D in FIG. 4.

As illustrated in FIG. 6, for example, the data processing means includes a database storing optimum positions of the movable partition plate 61 in the collection container 7. The optimum positions are determined based on the mixing rates of the types in the mixed plastic piece group, which are obtained from the results of the identification in the identifying step, so that plastics can be collected with higher sorting accuracy.

In the data processing means, a partition plate position determination unit determines, from the database, the optimum position of the movable partition plate 61 corresponding to the mixing rates of the types of the plastics in the mixed plastic piece group, which are obtained from the results in the identifying step, and sends the data of the optimum position to a partition plate control unit.

Further, the partition plate position control unit sends a partition plate position control signal for controlling a position of the movable partition plate 61 to an optimum position. In response to the signal, the position of the movable partition plate 61 is adjusted.

Figure 7:
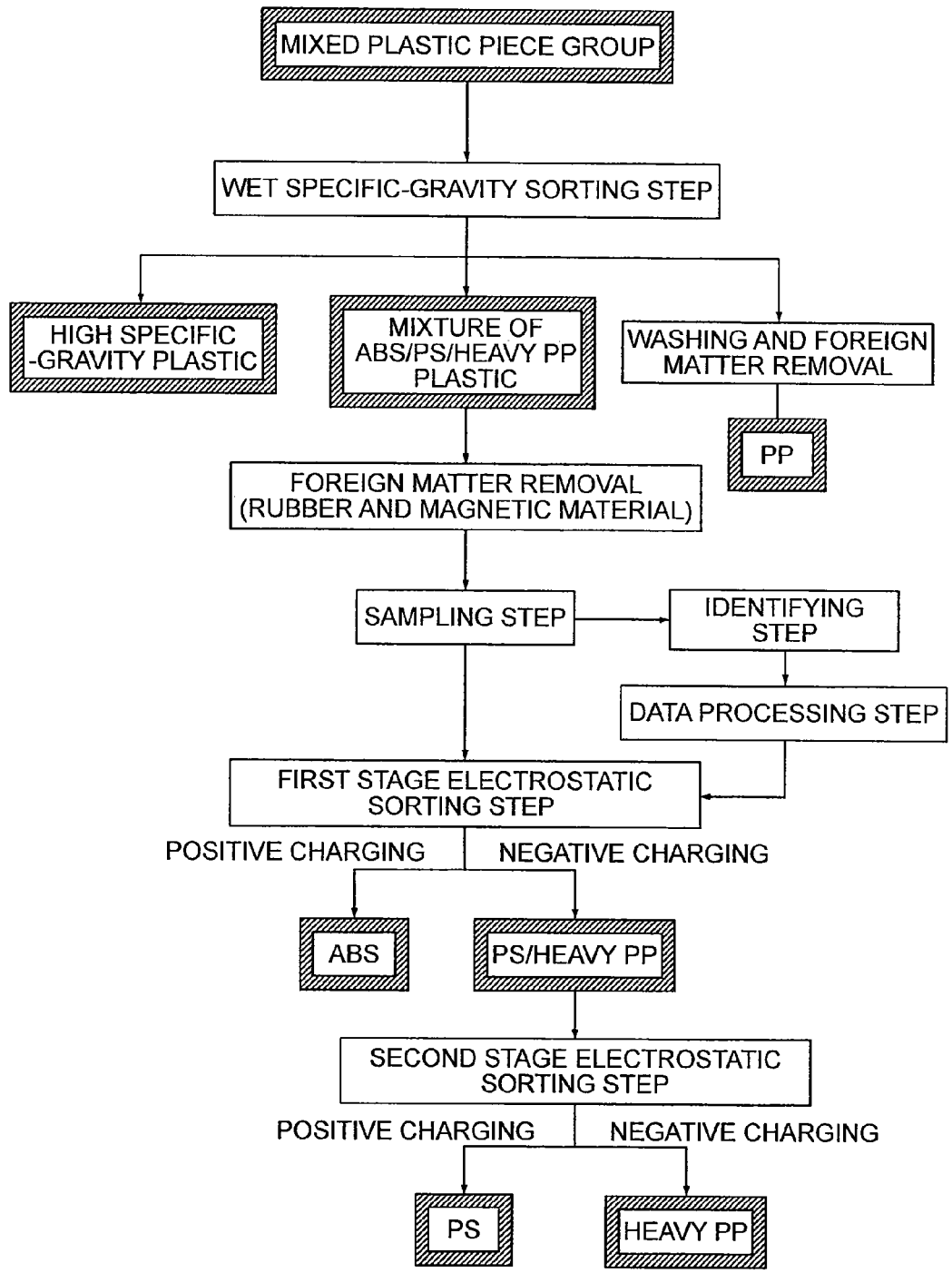
FIG. 7 A flowchart illustrating another sorting method for plastics according to the third embodiment of the present invention.

Further, as illustrated in FIG. 7, as in the second embodiment described above, type identification is performed on each of the plastic pieces which are picked up as the samples by the sampling means in the sampling step and pass through the identifying means. Results of the identification may be sent into the data processing step, and the mixing rate of each of the types in the mixed plastic piece group may be calculated by the data processing means.

With this, electrostatic sorting conditions can be set in accordance with the mixing rates, and hence a novel and marked advantage of highly accurate and highly efficient collection can be achieved.

According to such a sorting method, optimum sorting conditions can be set in accordance with the mixing rates prior to sorting. Thus, a collection yield and a collection rate of sorted ABS plastic pieces and collection rates of PS plastic pieces and high specific-gravity PP plastic pieces are enhanced, and hence highly efficient sorting can be performed.

The mixing rate may be calculated based not only on the number of plastic pieces as in this embodiment, but also on a weight ratio obtained by calculating an approximate weight of the plastic pieces, for example, from sizes of the plastic pieces and from a specific gravity calculated based on a type of the plastic pieces. In order to more accurately calculate the mixing rate based on the weight ratio, a weighing instrument may be installed so that the weight ratio is obtained by calculating a weight of the plastic pieces prior to or after the identification with the optical identification apparatus.

Figure 8:
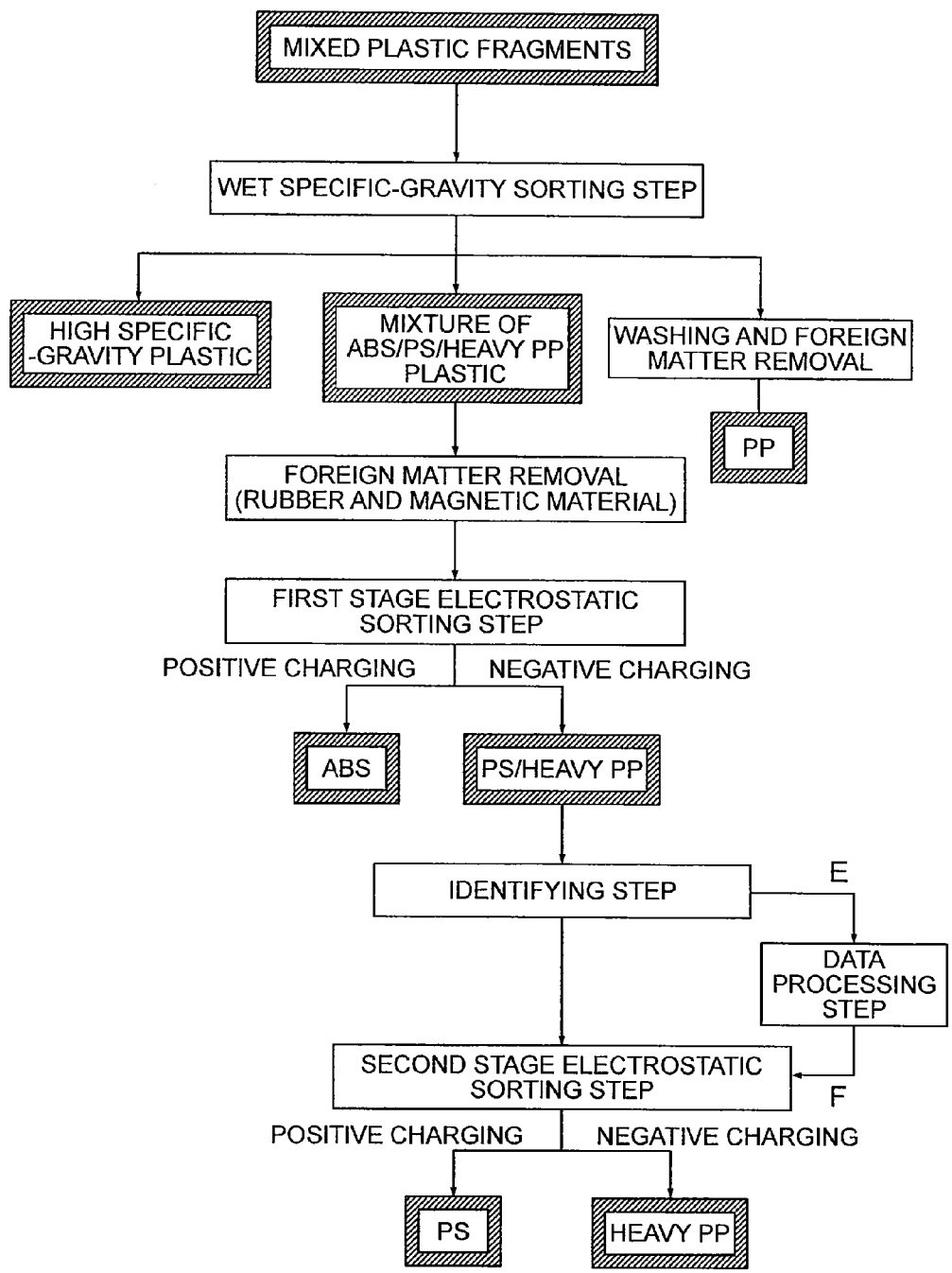
FIG. 8 A flowchart illustrating still another sorting method for plastics according to the third embodiment of the present invention.
Figure 9:
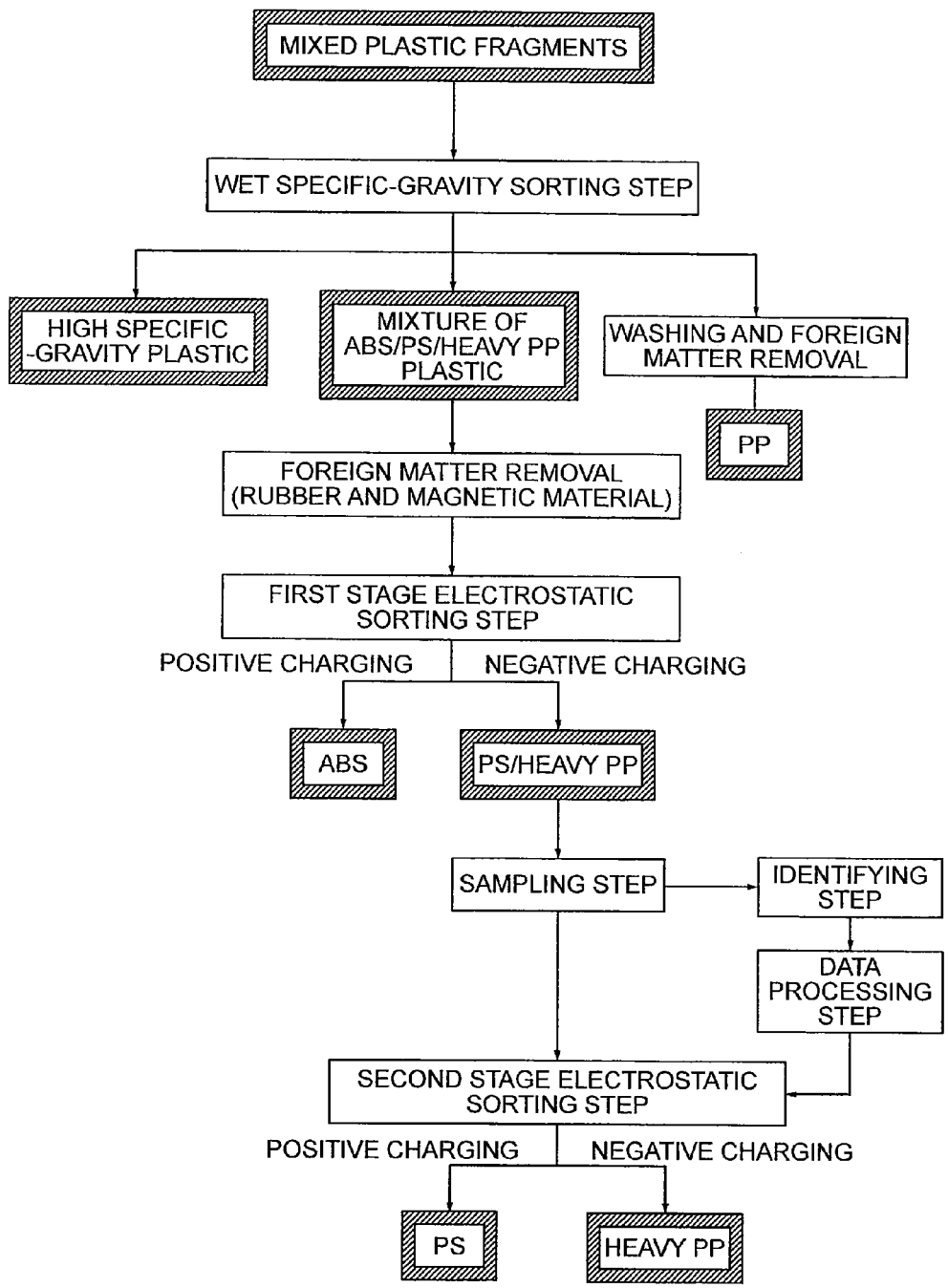
FIG. 9 A flowchart illustrating yet another sorting method for plastics according to the third embodiment of the present invention.

Further, the description is made of the case where the identifying step is performed prior to the first stage electrostatic sorting step, but the same advantage can be obtained also in a case where the identifying step is performed prior to the second stage electrostatic sorting step as illustrated in FIGS. 8 and 9.

Figure 10:
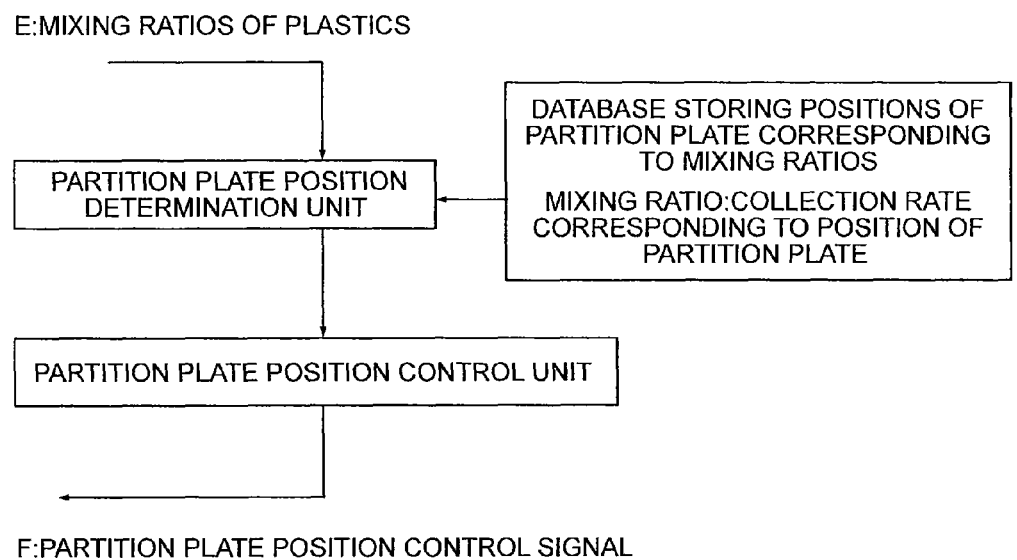
FIG. 10 A schematic configuration view illustrating another data processing step according to the third embodiment of the present invention.

FIG. 10 is a schematic configuration view illustrating the data processing step. Reference symbols E and F in FIG. 10 correspond respectively to reference symbols E and F in FIG. 8. The operation illustrated in FIG. 10 is the same as that illustrated in FIG. 6, and hence description thereof is omitted.

Fourth Embodiment

Unlike the embodiments described above in which the identifying step is performed prior to the sorting steps, identification with the identifying means may be performed on a sorted and collected recycled plastic piece group so that the collection yield of sorted PP plastic pieces is obtained.

Figure 11:
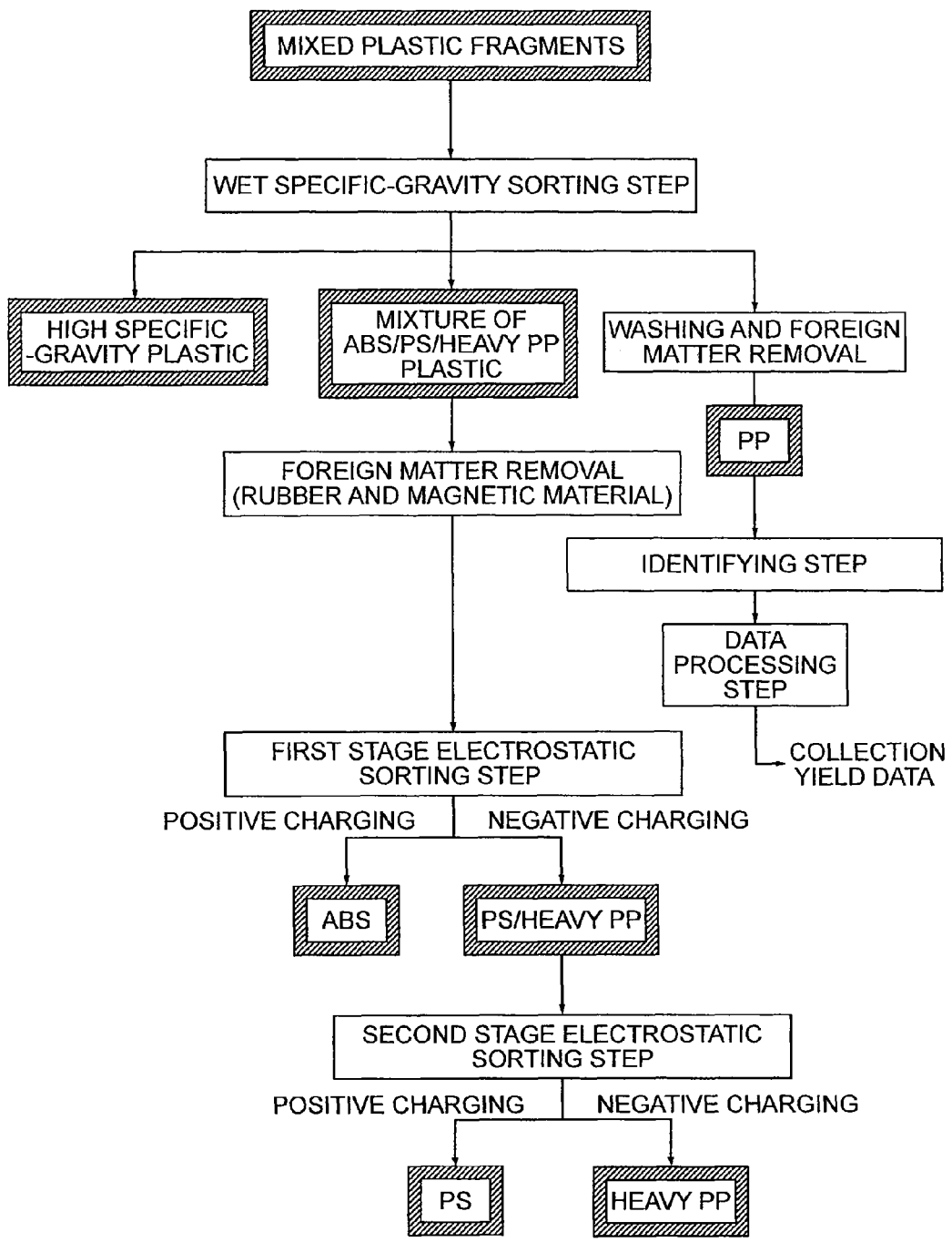
FIG. 11 A flowchart illustrating a sorting method for plastics according to a fourth embodiment of the present invention.

FIG. 11 is a flowchart illustrating a sorting method for plastics according to a fourth embodiment of the present invention.

The types of the sorted PP plastic pieces are identified with the optical identification apparatus, and results of the identification are sent into the data processing step. In this way, collection yield data such as rates of the numbers of plastic pieces of the other types as impurities can be obtained.

Management of the collection yield may be performed on all the sorted and collected recycled plastic pieces, or may be performed after the sampling with the sampling means described above.

Specifically, based on the numbers of plastic pieces other than the PP plastic pieces, which are obtained through examination of one thousand plastic pieces, the collection yield of the sorted PP plastic pieces is obtained.

For example, a mid-infrared beam is used as a beam, and the optical identification apparatus and the conveying apparatus, which are the same as those described in the first embodiment, are used.

In this way, this sorting method includes a step of identifying sorted plastic pieces, and hence quality control can be stably performed. In addition, it is unnecessary to perform a pre-process on those plastic pieces as identification objects, and hence the collection yield can be easily and automatically obtained. As a result, the management of the collection yield can be efficiently performed.

Figure 12:
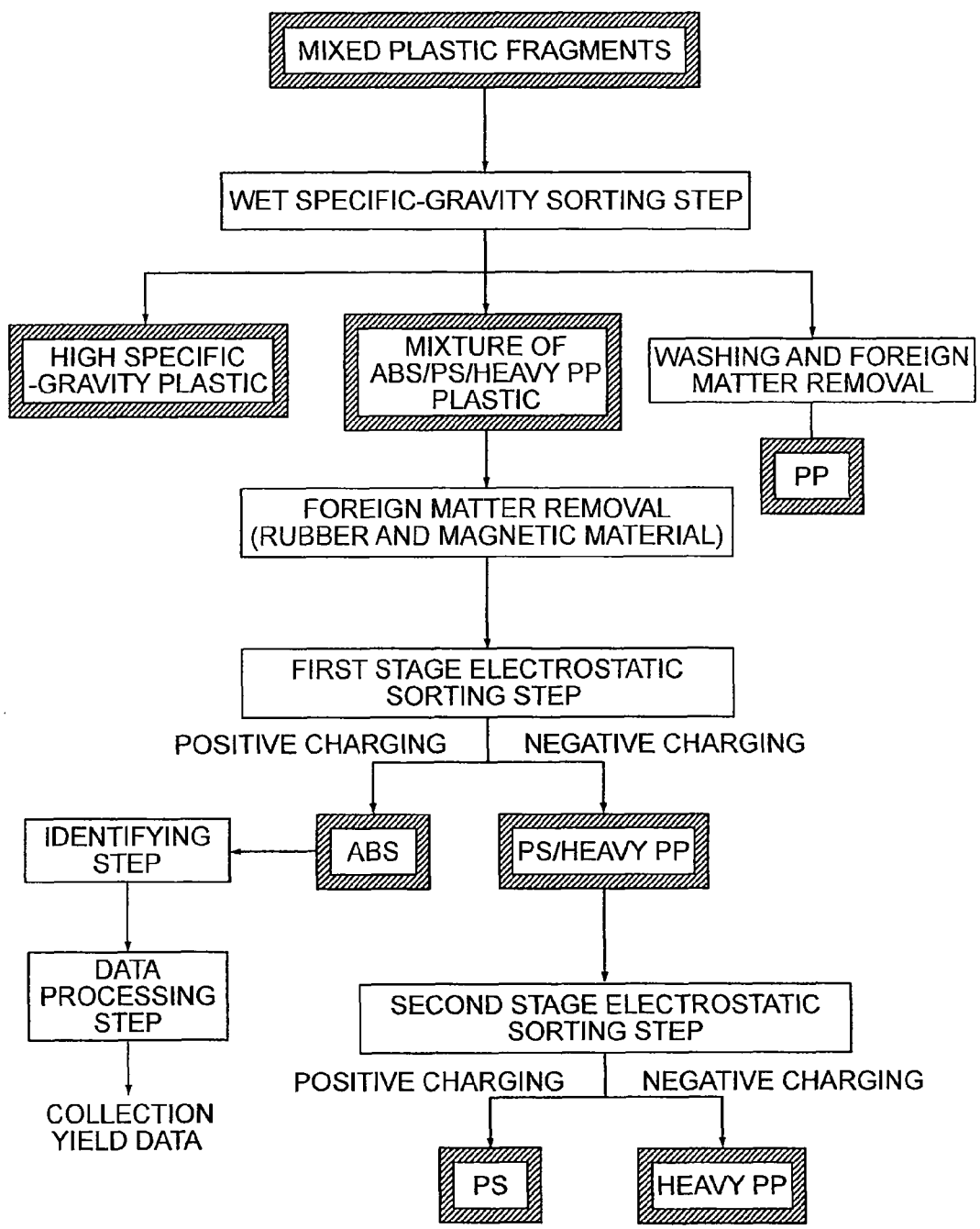
FIG. 12 A flowchart illustrating another sorting method for plastics according to the fourth embodiment of the present invention.
Figure 13:
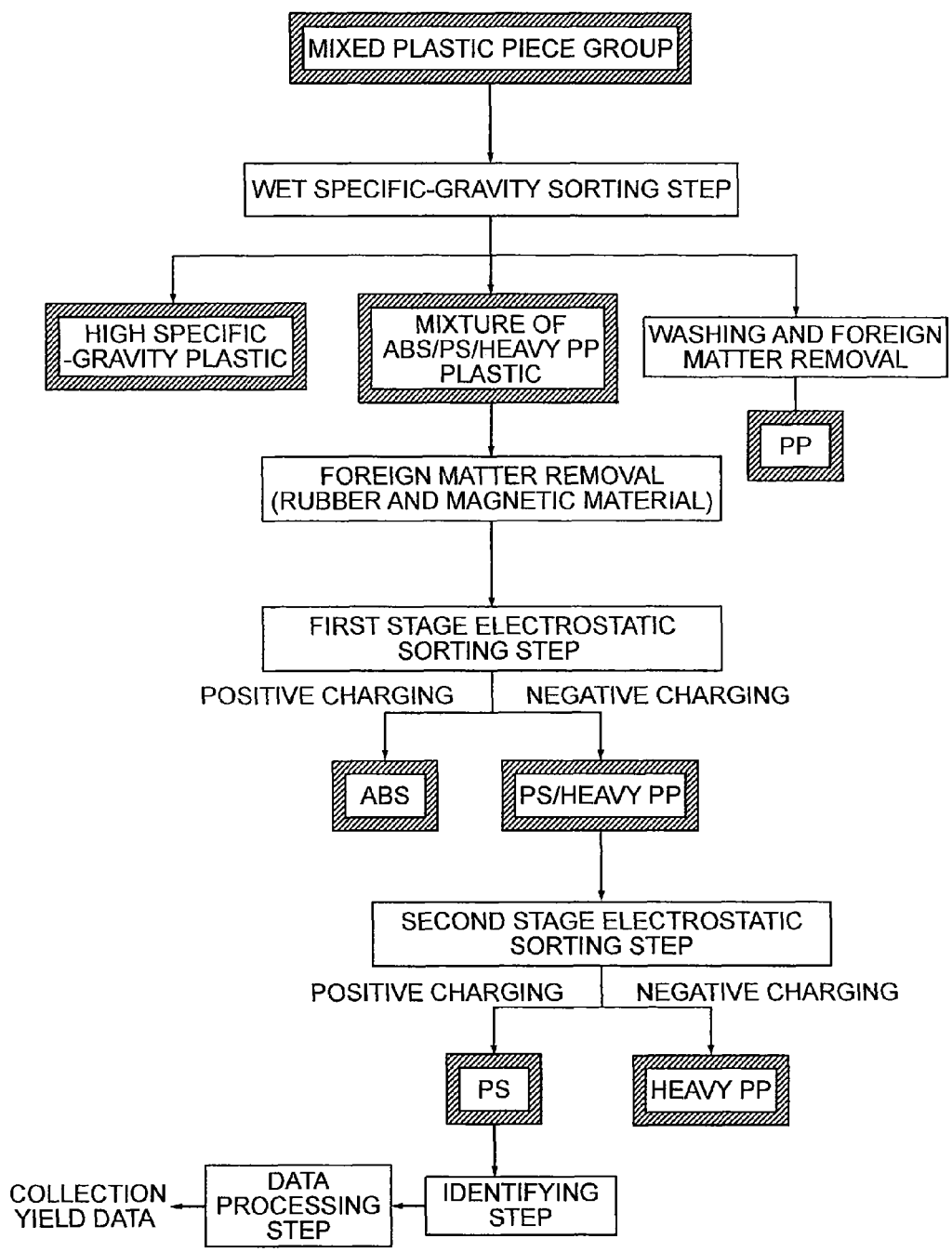
FIG. 13 A flowchart illustrating still another sorting method for plastics according to the fourth embodiment of the present invention.

This step may be performed on sorted ABS plastic pieces as illustrated in FIG. 12, or may be performed on sorted PS plastic pieces as illustrated in FIG. 13.

Also in those cases, the step of identifying sorted plastic pieces is performed, and hence quality control can be stably performed. In addition, it is unnecessary to perform a pre-process on those plastic pieces as identification objects, and hence the collection yield can be easily and automatically obtained. As a result, the management of the collection yield can be efficiently performed.

With regard to the number of samples, which is set to one thousand in the example described above, when the number of samples is small, mixing rates of the impurities in the mixed plastic piece group subjected to sampling and mixing rates of the impurities in a universe (all the sorted and collected recycled plastic pieces) do not match each other. Meanwhile, when the number of samples is large, identification takes a longer period of time. When the mixing rates of the impurities are approximately 1%, amounts of the impurities can be roughly obtained through sampling on approximately one thousand plastic pieces. Meanwhile, when the mixing rates of the impurities are 0.1%, it is necessary to perform sampling on approximately ten thousand plastic pieces.

Note that, the management of the collection yield may be performed based not only on the rates of the numbers of plastic pieces of the other types as impurities, but also on rates of weights thereof.

Fifth Embodiment

In the fourth embodiment, identification with the identifying means is performed on the sorted and collected recycled plastic piece group so as to calculate the collection yield of the sorted PP plastic pieces, ABS plastic pieces, or PS plastic pieces. In this manner, the management of the collection yield is performed. In this embodiment, subsequent sorting conditions of sorting steps are set based on those collection yields.

Figure 14:
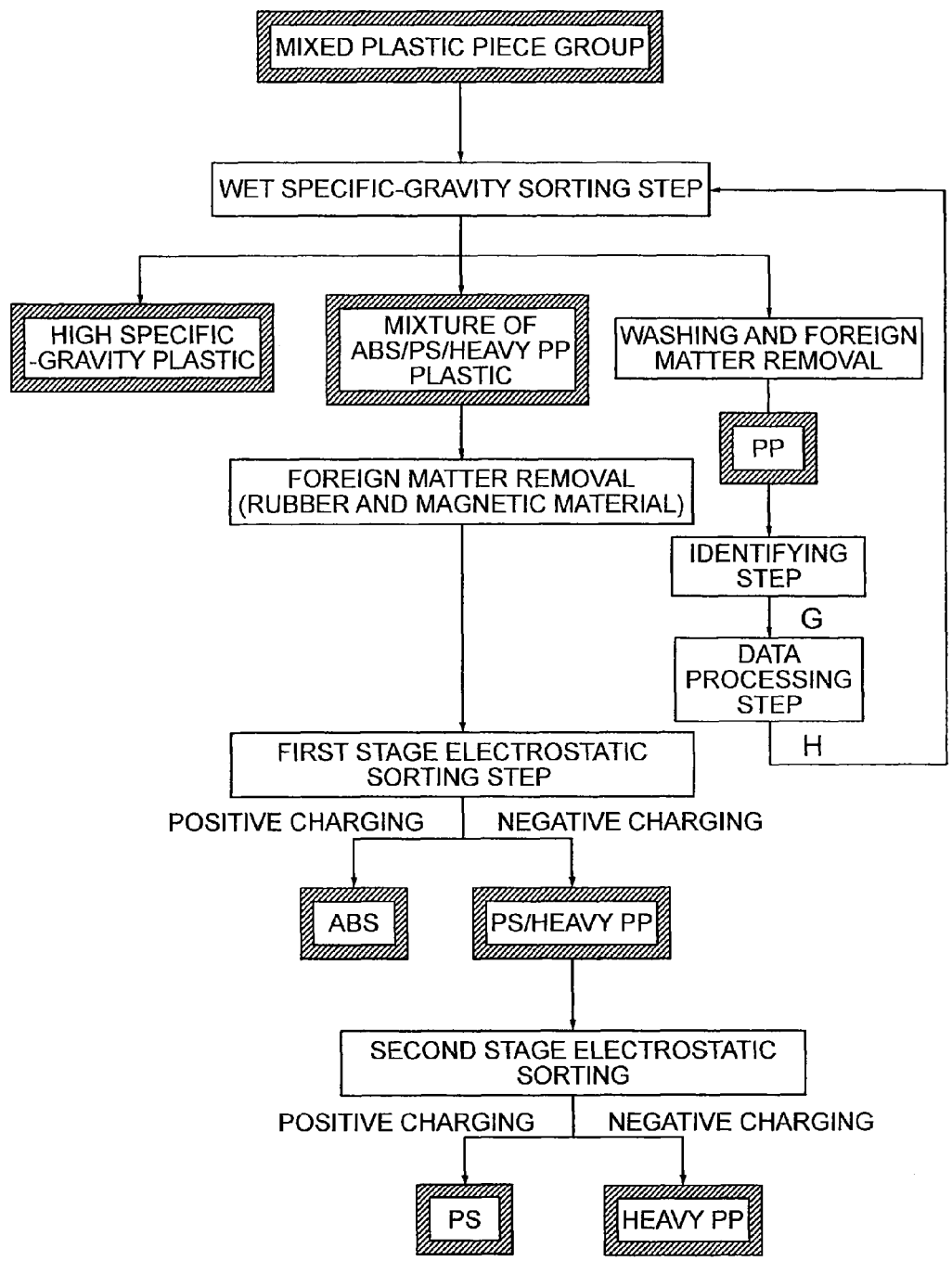
FIG. 14 A flowchart illustrating a sorting method for plastics according to a fifth embodiment of the present invention.

FIG. 14 is a flowchart illustrating a sorting method for plastics according to a fifth embodiment of the present invention.

As illustrated in FIG. 14, the fifth embodiment is different from the first embodiment or the fourth embodiment in that subsequent optimum sorting conditions of the wet specific-gravity sorting means are set based on the collection yield of the PP plastic pieces sorted in the wet specific-gravity sorting step. When the collection yield of the collected PP plastic pieces is high, the wet specific-gravity sorting is performed under the same sorting condition. Meanwhile, when the collection yield is low, an optimum sorting condition is reset in accordance with the low collection yield.

As illustrated in FIG. 14, identification results obtained in the identifying step are sent into the data processing step. Then, based on the obtained collection yield of the PP plastic pieces, control is performed on at least one of the supply amount with respect to the supply port 23 of the wet specific-gravity sorting apparatus, at least one area of the lower discharge port 26, the upper front discharge port 27, and the upper rear discharge port 28, the specific gravity of the salt water 24 (specific gravity liquid), and the like.

Figure 15:
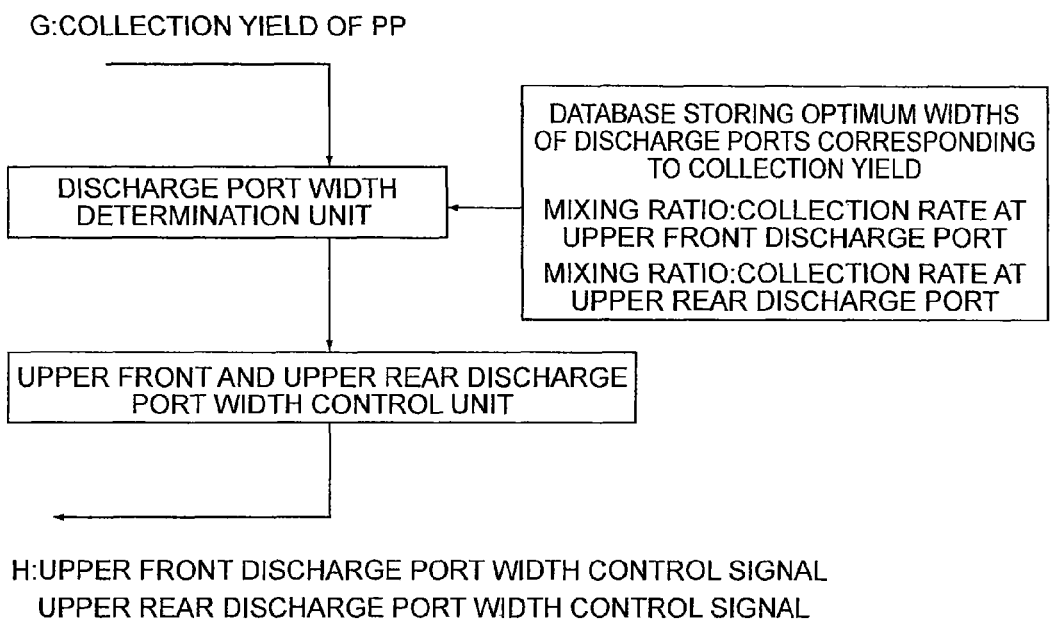
FIG. 15 A schematic configuration view illustrating a data processing step in the sorting method for plastics according to the fifth embodiment of the present invention.

FIG. 15 is a schematic configuration view illustrating the data processing step in the sorting method for plastics according to the fifth embodiment of the present invention. Reference symbols G and H in FIG. 15 correspond respectively to reference symbols G and H in FIG. 14.

As illustrated in FIG. 15, for example, the data processing means includes a database storing optimum widths of the discharge ports 27 and 28. The optimum widths are determined based on the collection yield of the PP plastic pieces so that the PP plastic pieces can be collected with higher sorting accuracy.

In the data processing means, the discharge port width determination unit determines, from the database, the optimum widths of the discharge ports 27 and 28 corresponding to the collection yield of the PP plastic pieces, which is obtained from the results of the identification in the identifying step, and sends the data of the optimum widths to the upper front and upper rear discharge port control unit.

Further, the upper front and upper rear discharge port control unit sends the upper front discharge port width control signal and the upper rear discharge port width control signal for controlling the widths of the upper front discharge port 27 and the upper rear discharge port 28 to the optimum widths. In response to those signals, the areas of the upper front discharge port 27 and the upper rear discharge port 28 are controlled.

According to such a sorting method, the sorting conditions are set based on the data of the collection yield management. Thus, for example, in a season in which the mixed rates of plastics do not extremely fluctuate, it is unnecessary to examine the mixing ratios prior to sorting, and sorting can be efficiently performed with high accuracy and high collection rate along with quality control.

Sixth Embodiment

In the fifth embodiment, the sorting conditions of the wet specific-gravity sorting step are set based on the collection yield of the sorted PP plastic pieces. In the sixth embodiment, the sorting conditions of the electrostatic sorting step are set based on a collection yield of sorted PS plastic pieces or sorted ABS plastic pieces.

Figure 16:
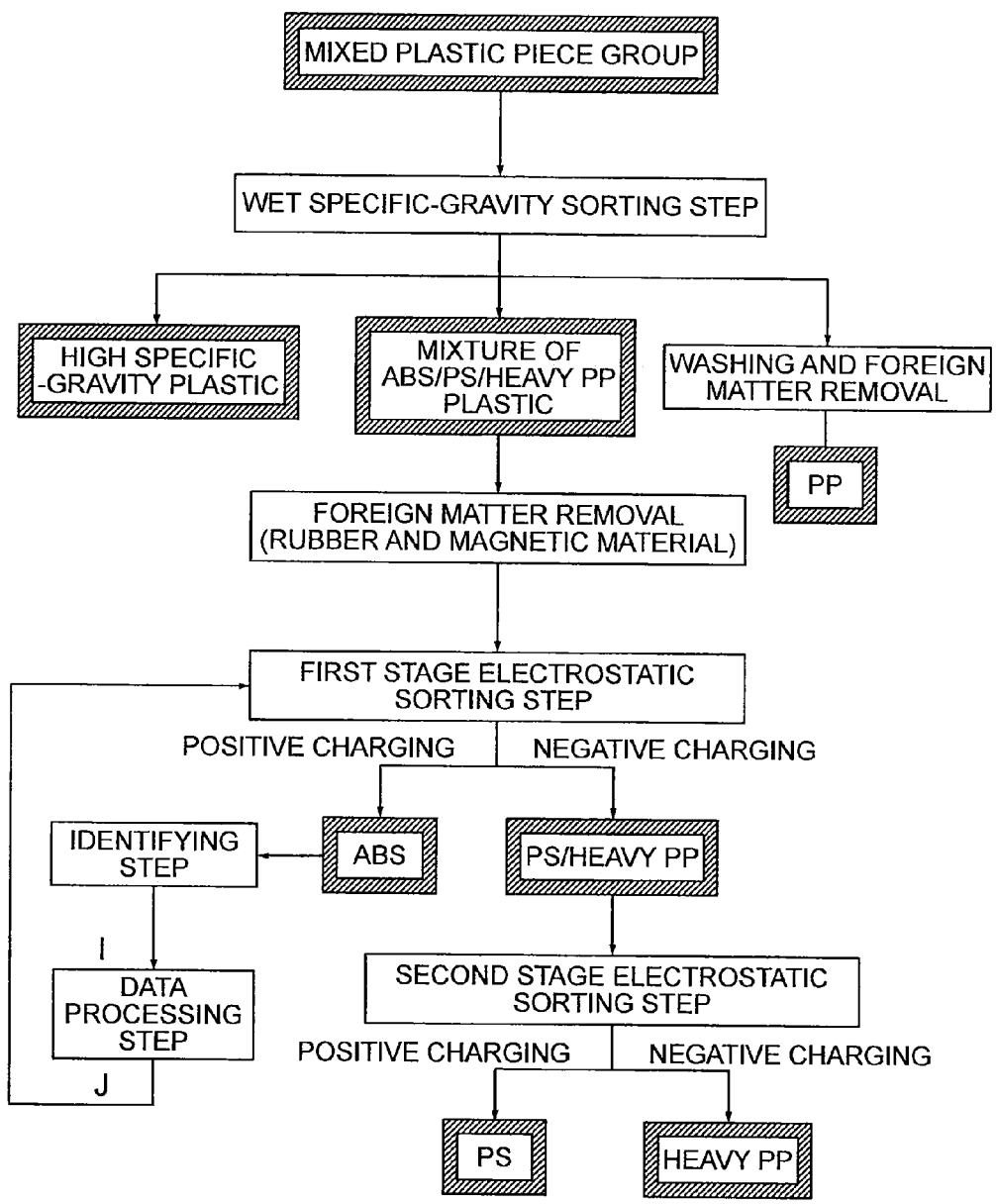
FIG. 16 A flowchart illustrating a sorting method for plastics according to a sixth embodiment of the present invention.

FIG. 16 is a flowchart illustrating a sorting method for plastics according to the sixth embodiment of the present invention.

As illustrated in FIG. 16, the identification results obtained in the identifying step are sent into the data processing step. Based on the obtained collection yield of the ABS plastic pieces, the position of the movable partition plate in the collection container, the voltages to be applied to the electrodes, the clearance between the electrodes in the first electrostatic sorting step, and the like are adjusted.

Figure 17:
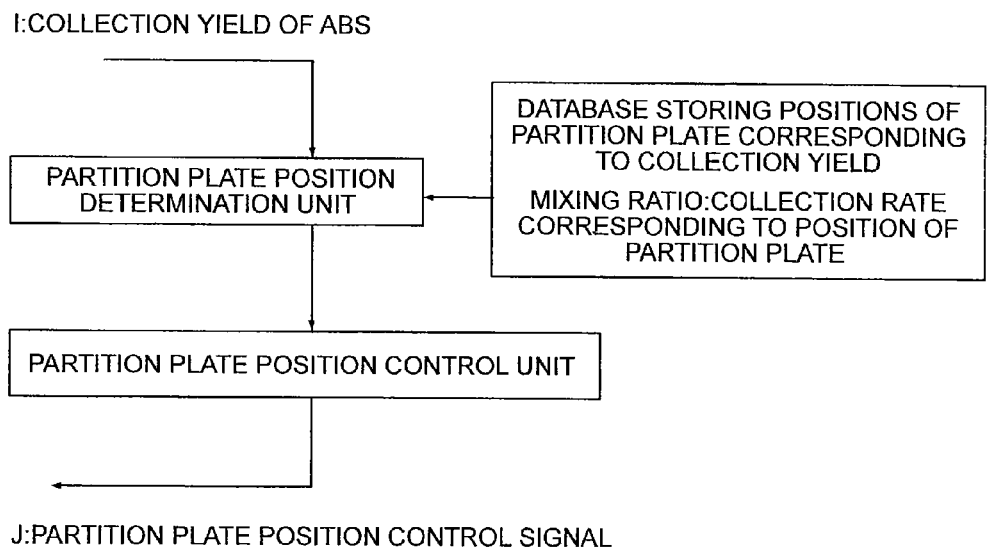
FIG. 17 A schematic configuration view illustrating a data processing step in the sorting method for plastics according to the sixth embodiment of the present invention.

FIG. 17 is a schematic configuration view illustrating the data processing step in the sorting method for plastics according to the sixth embodiment of the present invention. Reference symbols I and J in FIG. 17 correspond respectively to reference symbols I and J in FIG. 16.

As illustrated in FIG. 17, the data processing means includes a database storing optimum positions of the movable partition plate 61 in the collection container 7. The optimum positions are determined based on the collection yield of the PS plastics or ABS plastics so that the plastics can be collected with higher sorting accuracy.

In the data processing means, the partition plate position determination unit determines, from the database, the optimum position of the movable partition plate 61 corresponding to the collection yield of the ABS plastics, which is obtained from the results of the identification in the identifying step, and sends the data of the optimum position to the partition plate position control unit.

Further, the partition plate position control unit sends the partition plate position control signal for controlling the position of the movable partition plate 61 to the optimum position. In response to the signal, the position of the movable partition plate 61 is adjusted.

According to such a sorting method, the sorting conditions are set based on the data of the collection yield management. Thus, for example, in a season in which the mixed rates of plastics do not extremely fluctuate, it is unnecessary to additionally examine the mixing ratios prior to sorting, and sorting can be efficiently performed with high accuracy and high collection rate along with quality control.

Figure 18:
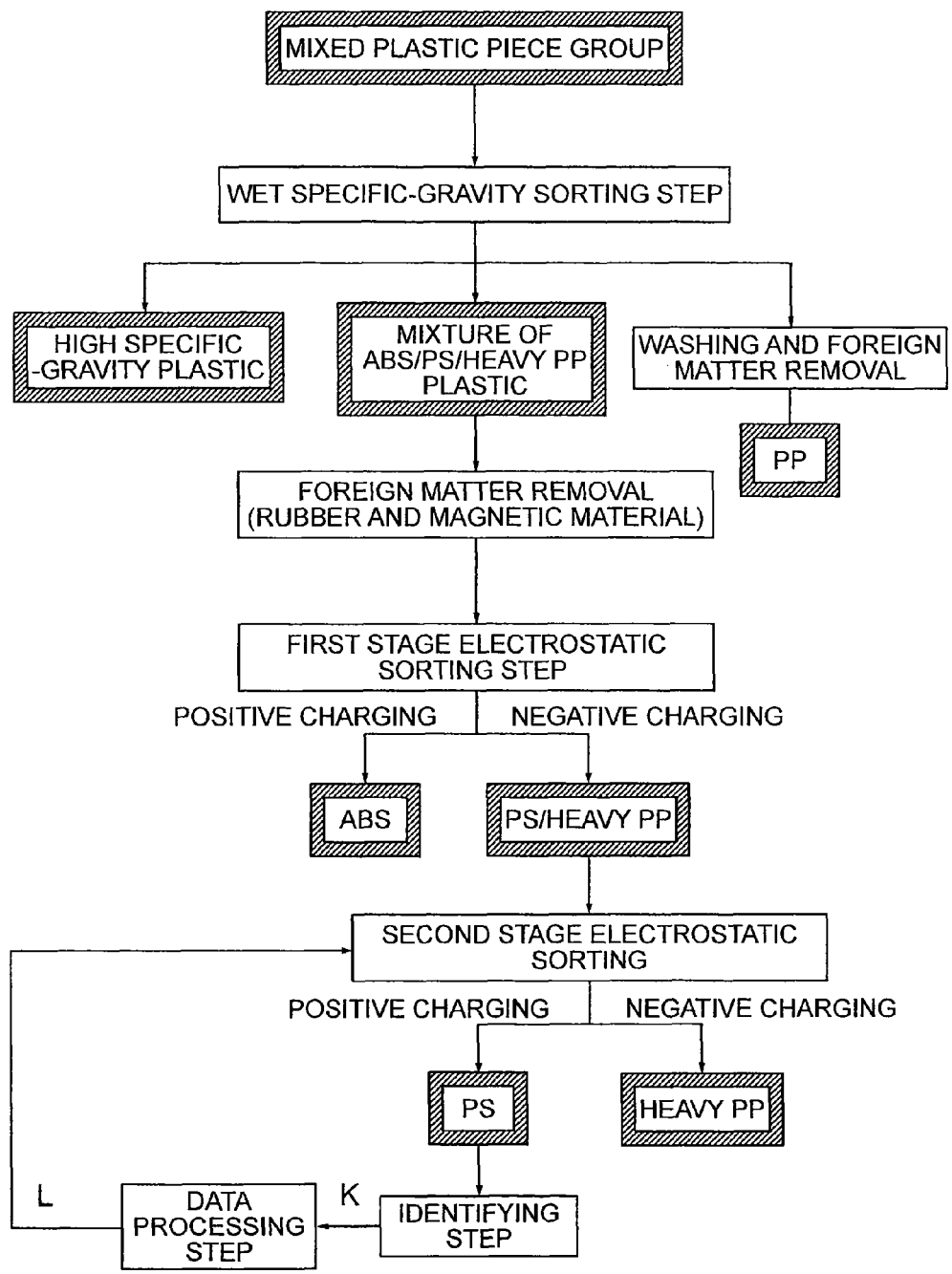
FIG. 18 A flowchart illustrating another sorting method for plastics according to the sixth embodiment of the present invention.

Referring to FIG. 16, the description is made of the case where the first stage electrostatic sorting step includes the identifying step, but the same advantage can be obtained also in a case where the second stage electrostatic sorting step includes the identifying step as illustrated in FIG. 18. In this embodiment, sorting conditions of the second stage electrostatic sorting step are set based on collection yield data along with the management of the collection yield of the PS plastic pieces.

Figure 19:
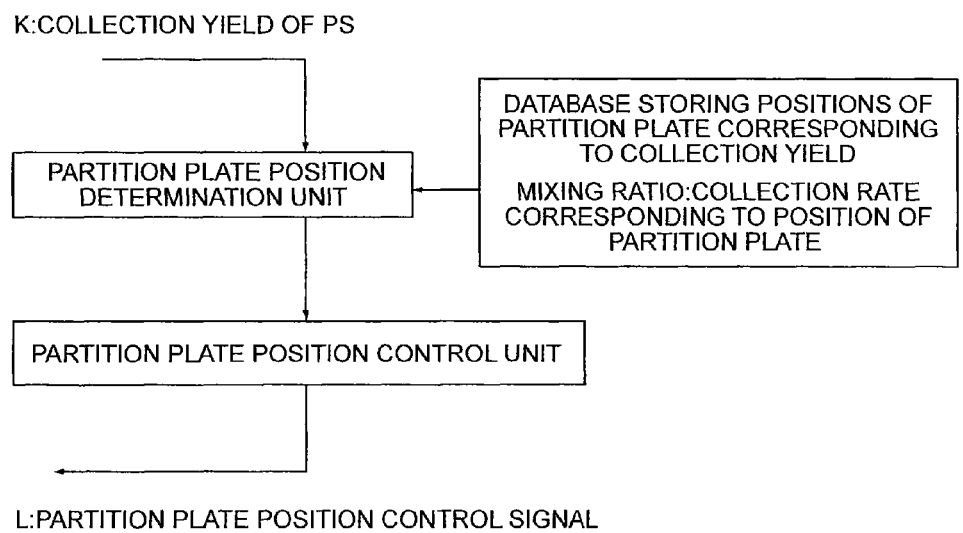
FIG. 19 A schematic configuration view illustrating another data processing step according to the sixth embodiment of the present invention.
Figure 20:
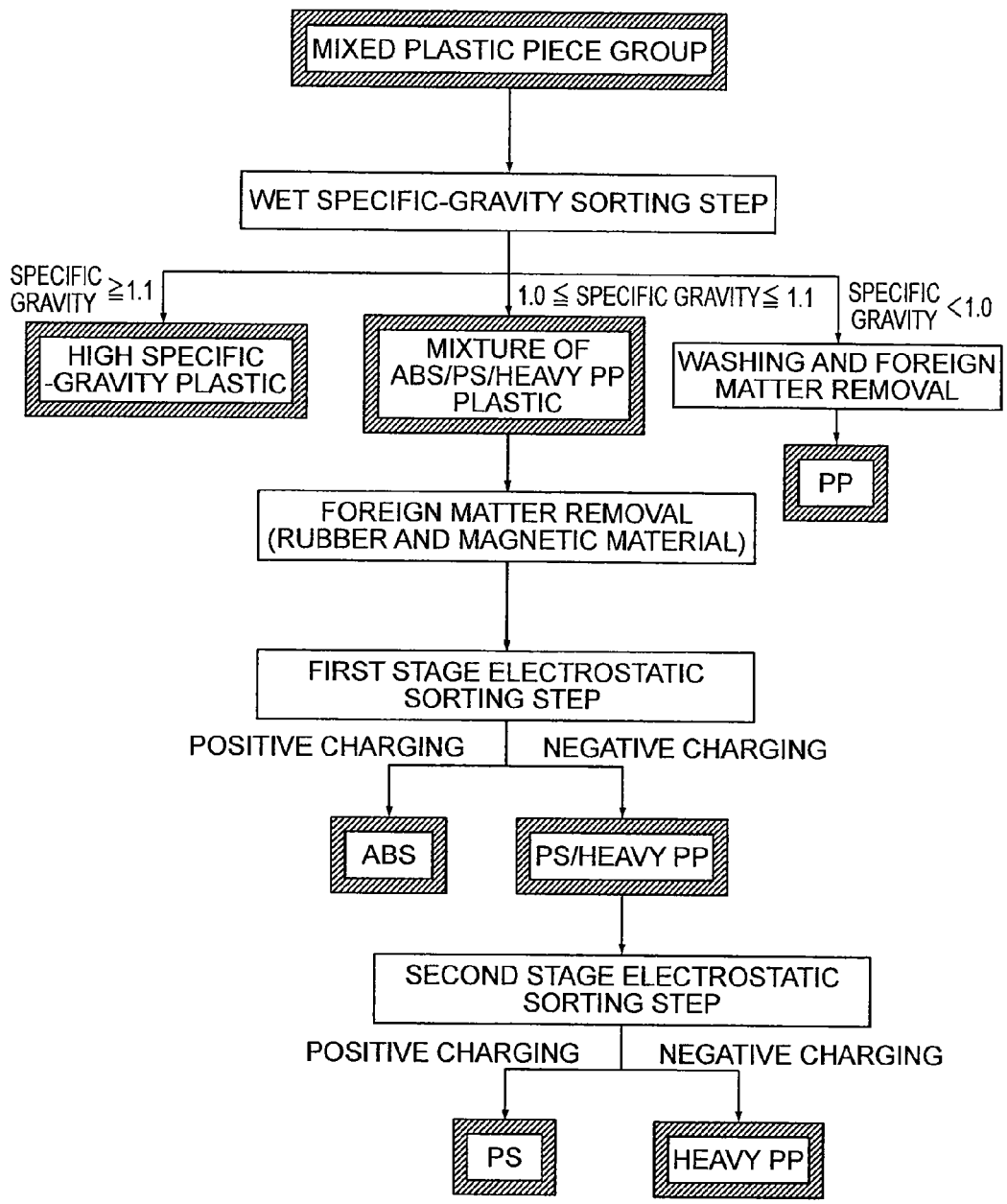
FIG. 20 A flowchart illustrating a conventional sorting method for plastics.

FIG. 19 is a schematic configuration view illustrating the data processing step in the sorting method for plastics according to the sixth embodiment of the present invention. Reference symbols K and L in FIG. 19 correspond respectively to reference symbols K and L in FIG. 18. The operation of the data processing step in FIG. 19 is the same as that illustrated in FIG. 17 except that the collection yield of the PS plastic pieces is managed instead of the collection yield of the ABS plastic pieces, and hence description thereof is omitted.

According to such a sorting method, the sorting conditions are set based on the data of the collection yield management. Thus, for example, in a season in which the mixed rates of plastics do not extremely fluctuate, it is unnecessary to additionally examine the mixing ratios prior to sorting, and sorting can be efficiently performed with high accuracy and high collection rate along with quality control.

REFERENCE SIGNS LIST 1 triboelectrification device, 2 conveying apparatus (vibrating trough), 4a first electrode (ground electrode), 4b second electrode (counter electrode), 5 high voltage power source, 7 collection container, 7a first container portion, 7b second container portion, 10a, 10b granular solid (plastic piece), 21 frame, 22 conveyance path, 23 vibrating portion, 24 dropping portion, 26 lower discharge port (discharge port), 27 upper front discharge port (discharge port), 28 upper rear discharge port (discharge port), 61 movable partition plate

The invention claimed is:

1. A sorting method for plastics, comprising:
a sorting step of sorting a predetermined plastic piece from a mixed plastic piece group comprising plastic pieces of a plurality of types;
an identifying step of identifying the plurality of types of the plastic pieces; and
a data processing step of calculating mixing rates of the plastic pieces of the plurality of types in the mixed plastic piece group based on a result obtained in the identifying step,
wherein the sorting step comprises a wet specific-gravity sorting step performed by using a wet specific-gravity sorting apparatus comprising:
a bath for storing a specific gravity liquid;
a supply port for supplying the mixed plastic piece group into the specific gravity liquid, the supply port being provided to the bath; and
a plurality of discharge ports for taking out the predetermined plastic piece from the bath, the plurality of discharge ports being provided to correspond respectively to the plurality of types of the plastic pieces,
wherein the wet specific-gravity sorting apparatus sorts the plastic pieces of the plurality of types, which are supplied into the specific gravity liquid, in accordance with the plurality of types by utilizing differences in specific gravity between the plurality of types of the plastic pieces, and
wherein the wet specific-gravity sorting step comprises controlling, based on the mixing rates of the plastic pieces of the plurality of types, which are calculated in the data processing step, at least one of:
a supply amount of the mixed plastic piece group into the supply port; and
an area of each of the plurality of discharge ports.

2. A sorting method for plastics according to claim 1,
wherein the identifying step is performed on the mixed plastic piece group prior to the sorting step,
wherein a sorting condition of the sorting step is set based on an identification result obtained in the identifying step, and
wherein the identifying step comprises identifying the plurality of types of the plastic pieces with a beam.

3. A production method for recycled plastics, comprising obtaining the recycled plastics by using the sorting method for plastics according to claim 1.

4. A sorting method for plastics, comprising:
a sorting step of sorting a predetermined plastic piece from a mixed plastic piece group comprising plastic pieces of a plurality of types;
an identifying step of identifying the plurality of types of the plastic pieces; and
a data processing step of calculating mixing rates of the plastic pieces of the plurality of types in the mixed plastic piece group based on a result obtained in the identifying step,
wherein the sorting step comprises an electrostatic sorting step,
wherein the electrostatic sorting step is performed by using electrostatic sorting means comprising:
a pair of electrodes which is electrically charged respectively with polarities opposite to each other and allows the mixed plastic piece group to pass therebetween;
a collection container for collecting the mixed plastic piece group which passes between the pair of electrodes; and
a movable partition plate for partitioning the collection container into a plurality of container portions, the movable partition plate being movable so as to change areas of collection ports of the plurality of container portions with respect to the plastic pieces,
wherein the electrostatic sorting means sorts and collects the plastic pieces in the mixed plastic piece group into the plurality of container portions, which are different from each other, in accordance with the plurality of types, and
wherein the electrostatic sorting step comprises controlling, based on the mixing rates of the plastic pieces of the plurality of types, which are calculated in the data processing step, at least one of:
voltages to be applied to the pair of electrodes; and
a clearance between the pair of electrodes.

5. A sorting method for plastics according to claim 4,
wherein the identifying step is performed on the mixed plastic piece group prior to the sorting step,
wherein a sorting condition of the sorting step is set based on an identification result obtained in the identifying step, and
wherein the identifying step comprises identifying the plurality of types of the plastic pieces with a beam.

6. A production method for recycled plastics, comprising obtaining the recycled plastics by using the sorting method for plastics according to claim 4.

7. A sorting method for plastics, comprising:
a sorting step of sorting a predetermined plastic piece from a mixed plastic piece group comprising plastic pieces of a plurality of types;
an identifying step of identifying a type of the predetermined plastic piece; and
a data processing step of calculating a collection yield of the predetermined plastic piece based on a result obtained in the identifying step,
wherein the identifying step and the data processing step are performed subsequent to the sorting step,
wherein the sorting step comprises a wet specific-gravity sorting step performed by using a wet specific-gravity sorting apparatus comprising:
a bath for storing a specific gravity liquid;
a supply port for supplying the mixed plastic piece group into the specific gravity liquid, the supply port being provided to the bath; and
a plurality of discharge ports for taking out the predetermined plastic piece from the bath, the plurality of discharge ports being provided to correspond respectively to the plurality of types of the plastic pieces,
wherein the wet specific-gravity sorting apparatus sorts the plastic pieces of the plurality of types, which are supplied into the specific gravity liquid, in accordance with the plurality of types by utilizing differences in specific gravity between the plurality of types of the plastic pieces, and
wherein the wet specific-gravity sorting step comprises controlling, based on the collection yield calculated in the data processing step, at least one of:
a supply amount of the mixed plastic piece group into the supply port;
an area of each of the plurality of discharge ports; and
a specific gravity of the specific gravity liquid.

8. A production method for recycled plastics, comprising obtaining the recycled plastics by using the sorting method for plastics according to claim 7.

9. A sorting method for plastics, comprising:
a sorting step of sorting a predetermined plastic piece from a mixed plastic piece group comprising plastic pieces of a plurality of types;
an identifying step of identifying a type of the predetermined plastic piece; and
a data processing step of calculating a collection yield of the predetermined plastic piece based on a result obtained in the identifying step,
wherein the identifying step and the data processing step are performed subsequent to the sorting step,
wherein the sorting step comprises an electrostatic sorting step performed by using electrostatic sorting means comprising:
a pair of electrodes which is electrically charged respectively with polarities opposite to each other and allows the mixed plastic piece group to pass therebetween;
a collection container for collecting the mixed plastic piece group which passes between the pair of electrodes; and
a movable partition plate for partitioning the collection container into a plurality of container portions, the movable partition plate being movable so as to change areas of collection ports of the plurality of container portions with respect to the plastic pieces,
wherein the electrostatic sorting means sorts and collects the plastic pieces in the mixed plastic piece group into the plurality of container portions, which are different from each other, in accordance with the plurality of types, and
wherein the electrostatic sorting step comprises controlling, based on the collection yield calculated in the data processing step, at least one of:
voltages to be applied to the pair of electrodes; and
a clearance between the pair of electrodes.

10. A production method for recycled plastics, comprising obtaining the recycled plastics by using the sorting method for plastics according to claim 9.

* * * * *